United States Patent
Kim et al.

(10) Patent No.: US 9,672,984 B2
(45) Date of Patent: Jun. 6, 2017

(54) MULTILAYER CERAMIC ELECTRONIC COMPONENT AND MANUFACTURING METHOD THEREOF

(71) Applicant: SAMSUNG ELECTRO-MECHANICS CO., LTD., Suwon-Si, Gyeonggi-Do (KR)

(72) Inventors: Hong Seok Kim, Suwon-Si (KR); Chung Eun Lee, Suwon-Si (KR); Chang Hoon Kim, Suwon-Si (KR); Doo Young Kim, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 320 days.

(21) Appl. No.: 14/484,614

(22) Filed: Sep. 12, 2014

(65) Prior Publication Data
US 2015/0380160 A1  Dec. 31, 2015

(30) Foreign Application Priority Data
Jun. 25, 2014 (KR) .................. 10-2014-0077870

(51) Int. Cl.
- *H01G 4/30* (2006.01)
- *H01G 4/00* (2006.01)
- *H01G 4/06* (2006.01)
- *H01G 4/005* (2006.01)
- *H01G 4/008* (2006.01)
- *H01G 4/12* (2006.01)
- *H01G 4/232* (2006.01)

(52) U.S. Cl.
CPC ............. *H01G 4/0085* (2013.01); *H01G 4/12* (2013.01); *H01G 4/30* (2013.01)

(58) Field of Classification Search
CPC  H01G 4/30; H01G 4/232; H01G 4/12; H01G 4/0085
USPC ........................ 361/321.1, 301.4, 303, 301.1
See application file for complete search history.

(56) References Cited

U.S. PATENT DOCUMENTS

| | | | |
|---|---|---|---|
| 2010/0226067 A1 * | 9/2010 | Osada | ................... C04B 35/016 361/311 |
| 2013/0063858 A1 * | 3/2013 | Dogan | ................. H01G 4/1218 361/301.4 |

FOREIGN PATENT DOCUMENTS

| | | | | |
|---|---|---|---|---|
| DE | WO 0131713 A1 * | 5/2001 | ........... H01L 41/083 |
| EP | 2 065 908 A1 | 6/2009 | |
| JP | 02235317 A * | 9/1990 | |
| JP | 2000-232032 A | 8/2000 | |
| WO | 2008/035727 A1 | 3/2008 | |

* cited by examiner

*Primary Examiner* — Eric Thomas
*Assistant Examiner* — Arun Ramaswamy
(74) *Attorney, Agent, or Firm* — McDermott Will & Emery LLP

(57) ABSTRACT

There are provided a multilayer ceramic electronic component capable of preventing problems occurring due to a difference in sintering behavior between ceramic layers and internal electrodes and having excellent reliability, and a manufacturing method thereof. The multilayer ceramic electronic component may include a ceramic body including a plurality of ceramic layers; and internal electrodes disposed in the ceramic body. The internal electrodes may contain a conductive ceramic oxide.

6 Claims, 2 Drawing Sheets

A-A'

MULTILAYER CERAMIC ELECTRONIC COMPONENT AND MANUFACTURING METHOD THEREOF

CROSS-REFERENCE TO RELATED APPLICATION

This application claims the benefit of Korean Patent Application No. 10-2014-0077870 filed on Jun. 25, 2014, with the Korean Intellectual Property Office, the disclosure of which is incorporated herein by reference.

BACKGROUND

The present disclosure relates to a multilayer ceramic electronic component and a manufacturing method thereof.

Generally, electronic components using a ceramic material, such as a capacitor, an inductor, a piezoelectric element, a varistor, a thermistor, and the like, include a ceramic body formed of the ceramic material, internal electrodes formed inside the ceramic body, and external electrodes formed on a surface of the ceramic body to be connected to the internal electrodes.

Among multilayer ceramic electronic components, a multilayer ceramic capacitor may include a plurality of stacked dielectric layers, internal electrodes disposed to face each other with at least one of the dielectric layers interposed therebetween, and external electrodes electrically connected to the internal electrodes.

Related Art Document (Patent Document 1) Japanese Patent Laid-Open Publication No. 2000-232032

SUMMARY

An exemplary embodiment in the present disclosure may provide a multilayer ceramic electronic component capable of preventing problems occurring due to a difference in sintering behavior between dielectric layers and internal electrodes and having excellent reliability, and a manufacturing method thereof.

According to an exemplary embodiment in the present disclosure, internal electrodes of a multilayer ceramic electronic component may be formed using a conductive ceramic oxide.

BRIEF DESCRIPTION OF DRAWINGS

The above and other aspects, features and advantages will be more clearly understood from the following detailed description taken in conjunction with the accompanying drawings, in which.

DETAILED DESCRIPTION

Figure 1:
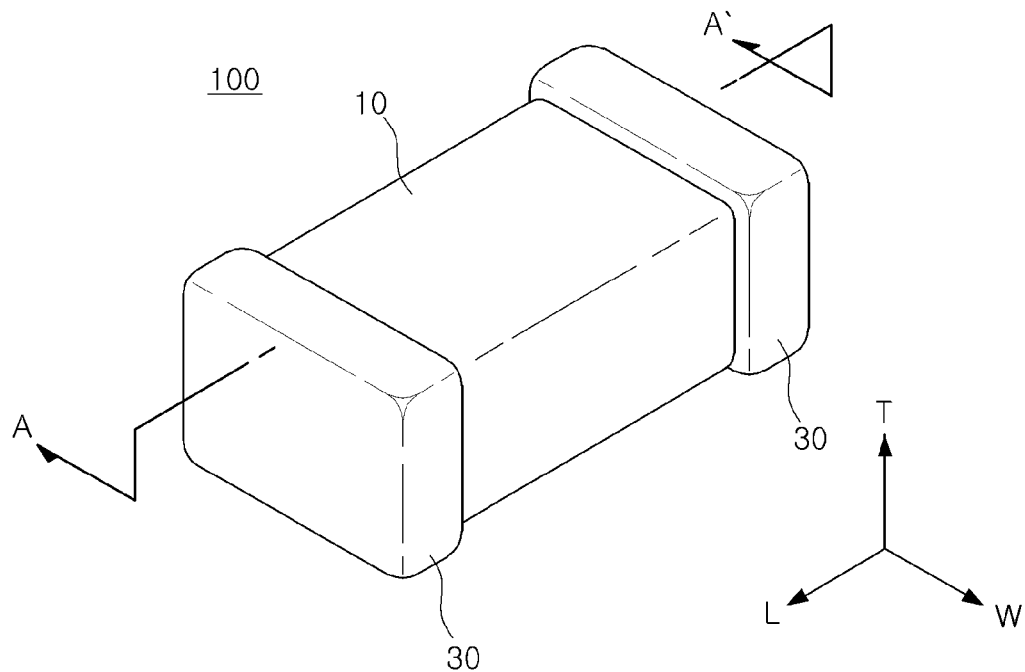
FIG. 1 is a schematic perspective view of a multilayer ceramic electronic component according to an exemplary embodiment in the present disclosure.

Exemplary embodiments in the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Multilayer Ceramic Electronic Component

Examples of an electronic component using a ceramic material may include a capacitor, an inductor, a piezoelectric element, a varistor, a thermistor, and the like. Hereinafter, a multilayer ceramic capacitor will be described as an example of the multilayer ceramic electronic component.

FIG. 1 is a schematic perspective view of a multilayer ceramic electronic component according to an exemplary embodiment in the present disclosure.

Referring to FIG. 1, a multilayer ceramic electronic component 100 according to this exemplary embodiment in the present disclosure may include a ceramic body 10 and external electrodes 30 formed on outer surfaces of the ceramic body 10.

The ceramic body 10 may be formed to have a hexahedral shape having both end surfaces opposing each other in a length L direction, both side surfaces opposing each other in a width W direction, and upper and lower surfaces opposing each other in a thickness T direction. The thickness direction refers to a direction in which ceramic layers are stacked, that is, a stacked direction.

The external electrodes 30 formed on the outer surfaces of the ceramic body 10 may be electrically connected to internal electrodes formed inside the ceramic body 10.

The external electrode 30 may be formed of a conductive metal, for example, copper (Cu), nickel (Ni), palladium (Pd), platinum (Pt), gold (Au), silver (Ag), iron (Fe), titanium (Ti), carbon (C), or an alloy thereof.

Figure 2:
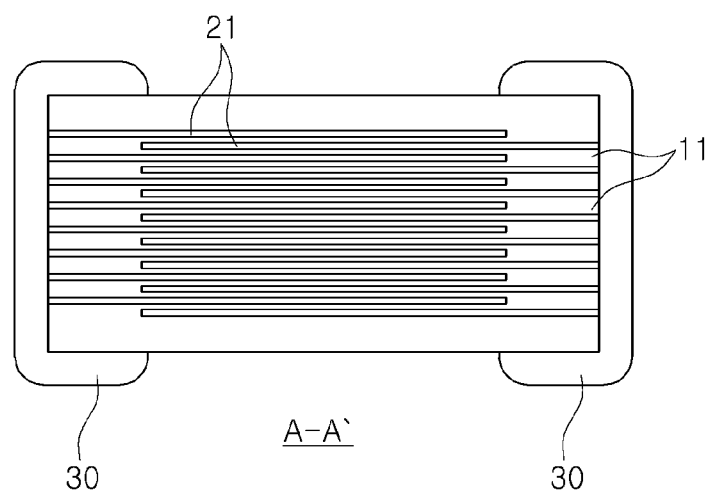
FIG. 2 is a cross-sectional view of the multilayer ceramic electronic component taken along line A-A' of FIG. 1.

FIG. 2 is a cross-sectional view of the multilayer ceramic electronic component taken along line A-A' of FIG. 1.

Referring to FIG. 2, the ceramic body 10 may be formed by stacking a plurality of ceramic layers 11. The plurality of ceramic layers 11 may be in a sintered state, and adjacent ceramic layers 11 may be integrated with each other so that boundaries therebetween are not readily apparent without a scanning electron microscope (SEM).

A shape and a dimension of the ceramic body 10 and the number of stacked ceramic layers 11 are not limited to those of the exemplary embodiment illustrated in FIG. 2.

Here, a thickness of the ceramic layer 111 may be arbitrarily changed in accordance with target capacitance of the multilayer ceramic electronic component 100.

The ceramic layer 11 may contain a dielectric material having high permittivity, for example, a barium titanate ($BaTiO_3$) based dielectric material or a strontium titanate ($SrTiO_3$) based dielectric material. However, the present disclosure is not limited thereto.

Examples of the barium titanate ($BaTiO_3$) based dielectric material may include $(Ba_{1-a}Ca_a)TiO_3$, $Ba(Ti_{1-b}Ca_b)O_3$, $(Ba_{1-a}Ca_a)(Ti1-bZrb)O_3$, $Ba(Ti_{1-b}Zr_b)O_3$, and the like, in which Ca, Zr, or the like, is partially dissolved.

In addition, the dielectric material may further contain a transition metal, a rare earth element, Mg, Al, and the like.

The ceramic body 10 may have internal electrodes 21 formed therein.

A pair of internal electrodes 21 having different polarities may be disposed to face each other in the stacked direction of the ceramic layers 11 with one ceramic layer 11 interposed therebetween.

Ends of the internal electrodes 21 may be exposed to the surface of the ceramic body 10 to thereby be connected to the external electrodes 30 formed on the outer surfaces of the ceramic body 10.

The internal electrode 21 may contain a conductive ceramic oxide.

According to the related art, internal electrodes have been formed using a conductive metal, for example, nickel (Ni). In this case, the dielectric material starts to be sintered and to shrink at a temperature of about 1000° C. or higher, while the internal electrodes formed of the conductive metal starts to be sintered and to shrink at a relatively low temperature of about 500° C., causing delamination between the ceramic layers and the internal electrodes occurring due to a difference in shrinkage behavior therebetween, structural defects such as cracks, warpage, or the like, and deteriorations of internal electrode connectivity.

Therefore, according to the exemplary embodiment in the present disclosure, the internal electrodes 21 are formed using the conductive ceramic oxide to decrease a difference in shrinkage behavior between the ceramic layers 11 and the internal electrodes 21 in a sintering process, whereby the aforementioned problems such as the delamination between the ceramic layers and the internal electrodes 21, the structural defects including cracks, the deteriorations of internal electrode connectivity, and the like, may be solved.

Meanwhile, according to the related art, a ceramic material has been added to a paste for forming the internal electrodes in order to match the sintering shrinkage behavior of the ceramic layers with the sintering shrinkage behavior of the internal electrodes.

However, the ceramic material may infiltrate into the ceramic layers in the sintering process to cause abnormal particle growth at interfaces between the ceramic layers and the internal electrodes, thereby increasing the thickness of the ceramic layer and decreasing capacitance.

However, when the internal electrodes 21 are formed of the conductive ceramic oxide according to the exemplary embodiment in the present disclosure, the difference in shrinkage behavior between the ceramic layers 11 and the internal electrodes 21 may be decreased without using a ceramic material powder.

In addition, there is no risk that conductivity will be decreased due to oxidation of the internal electrodes in the sintering process, whereby the sintering process may be performed under oxidizing atmosphere.

As an example of the internal electrodes 21 containing the conductive ceramic oxide, metal oxide transparent electrodes may be used.

The metal oxide transparent electrodes may contain, for example, an indium-tin (In—Sn) composite oxide, a fluorine-tin (F—Sn) composite oxide, an indium-titanium (In—Ti) composite oxide, or the like.

That is, the internal electrodes 21 may be formed of metal oxide transparent electrodes containing at least one selected from the group consisting of an indium tin oxide (ITO), a fluorine tin oxide (FTC)), and a titanium indium oxide (ITiO).

According to another exemplary embodiment in the present disclosure, the conductive ceramic oxide forming the internal electrodes 21 may be a metal oxide having a perovskite structure.

The metal oxide having the perovskite structure may be represented by Chemical Formula 1.

$$A_{1-x}A'_xB_{1-y}B'_yO_3$$ [Chemical Formula 1]

In Chemical Formula 1, A is at least one element selected from the group consisting of Ba, La, and Sm; A' is at least one element selected from the group consisting of Sr, Ca, and Ba and is different from A; B and B' are at least one element selected from the group consisting of Mn, Fe, Co, Ni, Cu, Ti, Nb, Cr, and Sc; and $0 \leq x < 1$ and $0 \leq y < 1$.

Examples of the conductive ceramic oxide may include a lanthanum strontium cobalt oxide, a lanthanum strontium cobalt iron oxide, a lanthanum calcium cobalt oxide, and the like.

For example, a $La_{1-x}(Ca \text{ or } Sr)_xCo_{1-y}Fe_yO_3$ based metal oxide ($0 \leq x < 1$ and $0 \leq y < 1$) may be used. More preferably, $0.1 \leq x < 0.4$ and $0.2 \leq y < 0.8$ may be satisfied.

For example, in the case of $La_{0.8}Ca_{0.2}CoO_3$ (x=0.2), $La_{0.6}Sr_{0.4}Co_{0.2}Fe_{0.8}O_3$ (x=0.4, y=0.8), and $La_{0.6}Sr_{0.4}CoO_3$ (x=0.4), excellent electrical conductivity may be exhibited.

The conductive ceramic oxide according to another exemplary embodiment in the present disclosure may be a metal oxide represented by Chemical Formula 2.

$$A_{2-z}A'_zBO_4$$ [Chemical Formula 2]

In Chemical Formula 2, A is at least one element selected from the group consisting of Ba, La, and Sm; A' is at least one element selected from the group consisting of Sr, Ca, and Ba and is different from A; B is at least one element selected from the group consisting of Mn, Fe, Co, Ni, Cu, Ti, Nb, Cr, and Sc; and $0 \leq z < 2$.

Examples of the conductive ceramic oxide may include a lanthanum strontium nickel oxide, a lanthanum calcium nickel oxide, a lanthanum strontium copper oxide, a lanthanum calcium copper oxide, and the like.

For example, a $La_{2-z}(Ca \text{ or } Sr)_z(Ni \text{ or } Cu)O_4$ based metal oxide ($0 \leq z < 2$) may be used. More preferably, the $0 \leq z < 1$ may be satisfied.

For example, in the case of $LaSrNiO_4$ (z=1), $LaSrCuO_4$ (z=1), and $La_{1.5}Ca_{0.5}NiO_4$ (z=0.5), excellent electrical conductivity may be exhibited.

The conductive ceramic oxide according to another exemplary embodiment in the present disclosure may be a silicon carbide (SiC) based oxide.

The internal electrodes 21 may contain 90 wt % or more of the conductive ceramic oxide.

By forming the internal electrodes 21 to contain 90 wt % or more of the conductive ceramic oxide, a difference in sintering behavior between the ceramic layers 11 and the internal electrodes 21 may be decreased, whereby delamination between the ceramic layers and the internal electrodes, structural defects such as cracks, deteriorations of internal electrode connectivity, and the like, may be prevented.

In the case in which the content of the conductive ceramic oxide contained in the internal electrodes 21 is less than 90 wt %, a shrinkage initiation temperature of the internal electrodes during the sintering process is relatively low as compared with the ceramic layers, resulting in delamination, or the like.

Method of Manufacturing Multilayer Ceramic Electronic Component

Figure 3:
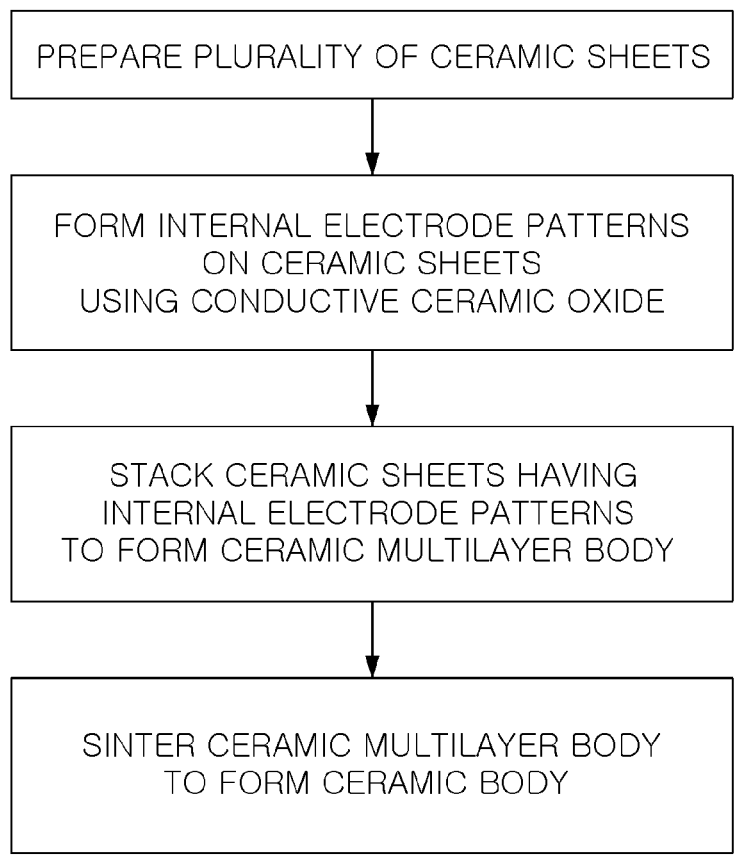
FIG. 3 is a flow chart illustrating a method of manufacturing a multilayer ceramic electronic component according to an exemplary embodiment in the present disclosure.

FIG. 3 is a flow chart illustrating a method of manufacturing a multilayer ceramic electronic component according to an exemplary embodiment in the present disclosure.

Referring to FIG. 3, a plurality of ceramic sheets may be prepared.

The ceramic sheets may be manufactured by preparing slurry by mixing a dielectric powder such as a barium titanate ($BaTiO_3$) based powder, or the like, with a ceramic additive, an organic solvent, a plasticizer, a binder, a dispersing agent, and the like, using a basket mill, and then applying the slurry to carrier films by a doctor blade method, or the like and drying the same.

Next, internal electrode patterns may be formed on the ceramic sheets using a conductive ceramic oxide.

The internal electrode patterns may be formed of the conducive ceramic oxide to decrease a difference in shrinkage behavior between the ceramic layers and the internal electrodes in a sintering process. Therefore, delamination between the ceramic layers and the internal electrodes, structural defects such as cracks, and deteriorations of internal electrode connectivity may be prevented.

In addition, since the difference in shrinkage behavior is decreased without separately adding a ceramic material, a problem that the ceramic material may infiltrate into the ceramic layers in the sintering process to cause abnormal particle growth at interfaces between the ceramic layers and the internal electrodes, thereby increasing the thickness of the ceramic layer and decreasing capacitance, may be prevented.

Since details of the conductive ceramic oxide have been provided in the above description of the multilayer ceramic electronic component, they will be omitted.

A method of forming the internal electrode patterns on the ceramic sheets using the conductive ceramic oxide is not particularly limited, but may be a screen printing method, a gravure printing method, or the like.

Next, the ceramic sheets having the internal electrode patterns formed thereon may be stacked and compressed in the stacked direction. Therefore, a ceramic multilayer body having the internal electrode patterns formed therein may be manufactured.

Next, the ceramic multilayer body may be cut for each region corresponding to one capacitor to thereby be manufactured in the form of a chip.

Here, the ceramic multilayer body may be cut so that one ends of the internal electrode patterns are alternately exposed through end surfaces of the body.

Then, the ceramic multilayer body in the form of the chip may be sintered to form a ceramic body.

Here, since the internal electrode patterns are formed of the conductive ceramic oxide, there is no risk that conductivity will be decreased due to oxidation of the internal electrodes in the sintering process. Therefore, the sintering process may be performed under oxidizing atmosphere, but is not limited thereto. That is, the sintering process may also be performed under reducing atmosphere.

Next, the external electrodes 30 may be formed to cover the end surfaces of the ceramic body 10 so that they are electrically connected to the internal electrodes 21 exposed to the end surfaces of the ceramic body 10.

The external electrodes 30 may be formed using a conductive paste containing a conductive metal, and may be formed by, for example, a dipping method, or the like.

Then, plating layers formed of nickel, tin, or the like, may be formed on surfaces of the external electrodes 30.

As set forth above, according to exemplary embodiments in the present disclosure, delamination between dielectric layers and internal electrodes, structural defects such as cracks, and deteriorations of internal electrode connectivity occurring due to a difference in sintering behavior between the dielectric layers and the internal electrodes may be prevented, and reliability may be improved.

While exemplary embodiments have been shown and described above, it will be apparent to those skilled in the art that modifications and variations could be made without departing from the scope of the invention as defined by the appended claims.

What is claimed is:

1. A multilayer ceramic electronic component comprising:
   a ceramic body including a plurality of ceramic layers; and
   internal electrodes disposed inside the ceramic body,
   wherein the internal electrodes contain a conductive ceramic oxide, and
   the conductive ceramic oxide is a $La_{1-x}(Ca$ or $Sr)_xCo_{1-y}Fe_yO_3$ based metal oxide ($0 \leq x < 1$ and $0 \leq y < 1$).

2. The multilayer ceramic electronic component of claim 1, wherein $0.1 \leq x < 0.4$ and $0.2 \leq y < 0.8$.

3. The multilayer ceramic electronic component of claim 1, wherein the internal electrodes contain 90 wt % or more of the conductive ceramic oxide.

4. A multilayer ceramic electronic component comprising:
   a ceramic body including a plurality of ceramic layers; and
   internal electrodes disposed inside the ceramic body,
   wherein the internal electrodes contain a conductive ceramic oxide, and
   the conductive ceramic oxide contains a silicon carbide (SiC).

5. A method of manufacturing a multilayer ceramic electronic component, the method comprising:
   preparing a plurality of ceramic sheets;
   forming internal electrode patterns on the ceramic sheets using a conductive ceramic oxide;
   stacking the ceramic sheets having the internal electrode patterns to form a ceramic multilayer body; and
   sintering the ceramic multilayer body to form a ceramic body,
   wherein the conductive ceramic oxide is a $La_{1-x}(Ca$ or $Sr)_xCo_{1-y}Fe_yO_3$ based metal oxide ($0 \leq x < 1$ and $0 \leq y < 1$).

6. A method of manufacturing a multilayer ceramic electronic component, the method comprising:
   preparing a plurality of ceramic sheets;
   forming internal electrode patterns on the ceramic sheets using a conductive ceramic oxide;
   stacking the ceramic sheets having the internal electrode patterns to form a ceramic multilayer body; and
   sintering the ceramic multilayer body to form a ceramic body,
   wherein the conductive ceramic oxide contains a silicon carbide (SiC).

* * * * *